K. SULZBERGER.
DYNAMO ELECTRIC MACHINE.
APPLICATION FILED APR. 8, 1905.
902,019.
Patented Oct. 27, 1908.
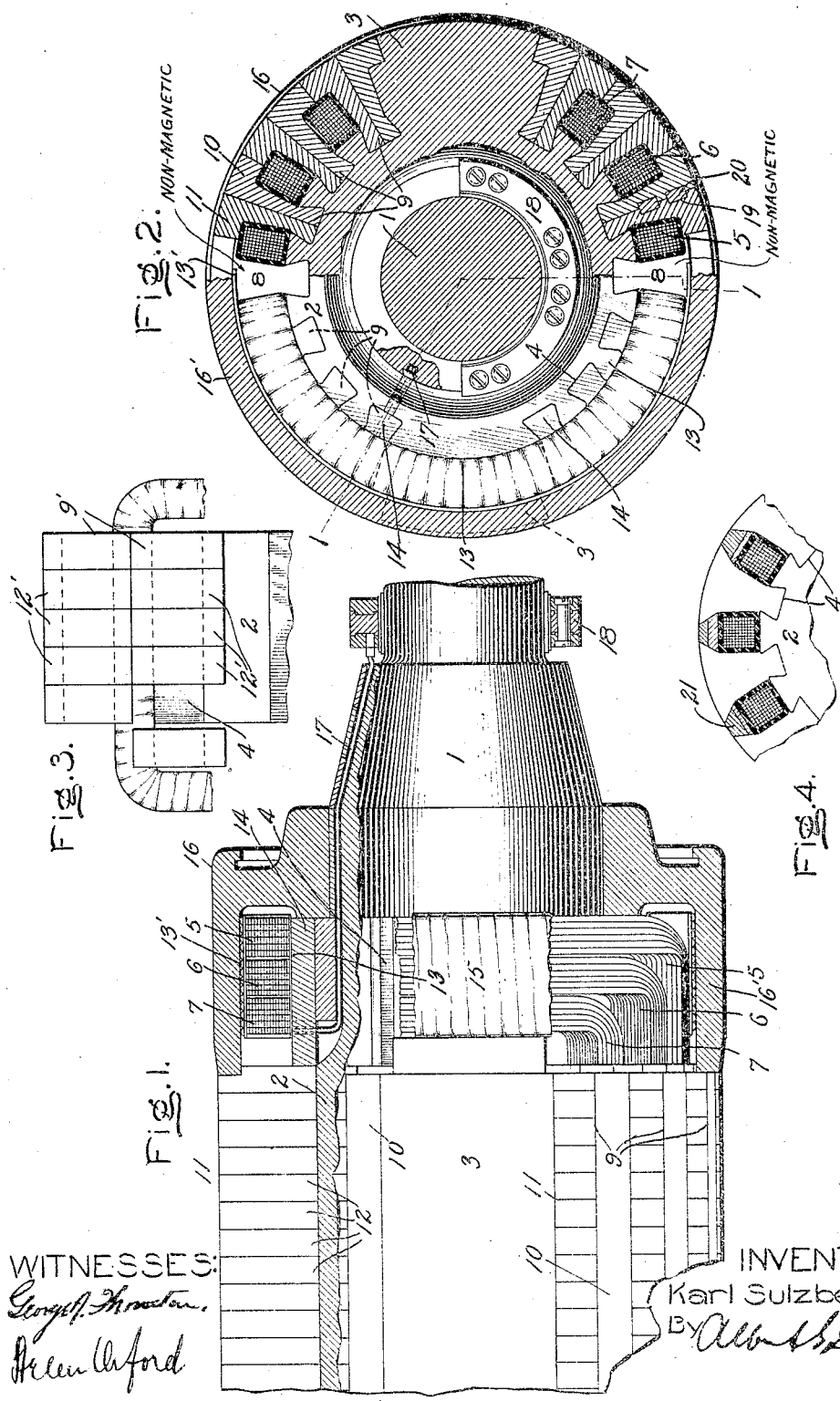
WITNESSES:
INVENTOR:
Karl Sulzberger,

UNITED STATES PATENT OFFICE.

KARL SULZBERGER, OF CHARLOTTENBURG, GERMANY, ASSIGNOR TO GENERAL ELECTRIC COMPANY, A CORPORATION OF NEW YORK.

DYNAMO-ELECTRIC MACHINE.

No. 902,019.      Specification of Letters Patent.      Patented Oct. 27, 1908.

Application filed April 8, 1905. Serial No. 254,461.

*To all whom it may concern:*

Be it known that I, KARL SULZBERGER, a citizen of Switzerland, residing at Charlottenburg, Germany, have invented certain new and useful Improvements in Dynamo-Electric Machines, of which the following is a specification.

My present invention relates to the construction of dynamo-electric machines, and more especially to the construction of the rotating members of dynamo-electric machines.

One object of my invention is the production of a construction in which "formed" coils may be positively but removably secured to the rotating member even when the opposite turns of coils are separated by many degrees of arc.

Another object obtained with my construction in some cases is the production of a rotating member having distributed windings and definite polar properties. This object of my invention I may obtain, while at the same time I produce a rotating member having a smooth external surface.

The embodiment of my invention which I have hereinafter described and illustrated also possesses many advantageous features of construction, which are pointed out with particularity in the claims annexed to and forming a part of this specification.

For a better understanding of my invention reference may be had to the accompanying description and drawings in which I have illustrated and described embodiments of my invention.

Of the drawings, Figure 1 is an elevation with parts broken away and in section on the line 1 1 of Fig. 2 showing a rotating member of a dynamo-electric machine embodying my invention; Fig. 2 is an end elevation of the construction shown in Fig. 1 with parts broken away and in section; Fig. 3 is a partial plan showing a modified construction; and Fig. 4 is a partial elevation showing another modification.

In the particular embodiment of my invention which I have shown in the drawings, 1 represents the shaft carrying the rotating two-pole field magnet of a dynamo-electric machine. The core proper 2 of the field magnet may be regarded as cylindrical in form with two similar diametrically-opposed integral polar projections 3. The core 2 and polar projections 3 may be solid and integral with the shaft 1, as shown, or formed of laminated iron in accordance with the conditions under which the machine is to be used. The outer surface of the core between the polar projections has formed in it a series of undercut grooves 4 which extend parallel to the axis of the shaft 1.

The windings for the field magnet comprise two similar sets of conductors in the form of three loops or coils 5, 6 and 7, one set surrounding each polar projection. The coils 5, 6 and 7 are secured in place by two diametrically-opposed coil or conductor holders 8 and four similar sets of coil or conductor holders 9. The coil holders or conductor-securing devices are provided with tenons or projections which enter the appropriate undercut grooves or slots 4. The holders 8 are located midway between the polar projections 3, and one set of holders 9 is located between each polar projection 3 and each support 8.

In the construction illustrated in Figs. 1 and 2 of the drawings each coil holder 8 is in one piece, while each coil holder 9 is formed in two parts or halves 10 and 11, the parts being separated by a substantially radial plane. The part 10 of each coil holder 9 is in the form of a bar the length of the polar projections and core body 2 proper. Each part 11, however, is divided into a number of short blocks or portions 12.

In assembling the field magnet after the windings are placed about the polar portions 3, the left-hand parts 10 of the coil support 9 are inserted radially in the proper undercut grooves 4. After this occurs the short blocks 12 are inserted into place one at a time. As clearly shown in Fig. 1 the distance between the right-hand end of the core body 2 proper and the inner surface of the right-hand end of the winding is slightly more than the thickness of one of the blocks 12. This allows of the axial insertion of the blocks 12, one at a time, in the proper undercut grooves or slots, after which they may be moved longitudinally into place in the proper undercut groove or slot formed by two walls of each slot 4 and one side of the part 10.

With the construction described the windings are secured rigidly and firmly in place without injury to the insulation of the coil in any manner, and without distortion of the coils. The coil holders 8 which are each similar to the coil holders 9, but are formed in one part each, may be moved axially into place after the windings are in position.

The coil holders 8 and 9 are so shaped that when inserted in place the core and coil holders form a cylindrical body pierced by a number of longitudinally-extending passages which extend parallel to the axis of the shaft 2, and are substantially rectangular in shape.

The core body 2 and polar portions 3 are, of course, formed of magnetic material and in some cases the coil holders 8 and 9 may also be formed of magnetic material and in other cases part of the coil holders may be made of magnetic materials while others are made of non-magnetic material. In many cases in the construction of field magnets I make the coil holders 8 of non-magnetic material such as phosphor bronze, and make all of the coil holders 9 of magnetic material. When parts of the coil holders 9 are made of non-magnetic material it will be understood that the non-magnetic parts are located adjacent to coil holders 8. This arrangement insures that the field magnet shall have sharply defined polar properties. In some cases one part or half of one or more of the holders 9 may be formed of non-magnetic material, while the other halves are formed of magnetic material.

In the construction shown in Fig. 1, the end portions of the windings rest on a supporting surface 13, carried by the shaft 1, which may be the outer surface of an extension of the core body proper, in which case the ends of the grooves 4 are filled by wedges or blocks 14. The ends of the windings may be firmly secured against the support by a layer of wire 13'. If desired, blocks or wedges may be inserted in the spaces at the bends of the coils or parts of the distributed windings and between the ends of the polar projections and the windings. It will, of course, be understood that the conductors are surrounded by suitable insulating material. Each set of coils may be taped together as shown at 15 in Fig. 1. A collar member 16 carried by the extension or support which may be shrunk on a reduced extension of the core body, is provided with a flange portion 16' which extends over the ends of the windings to the end of the core body 2 proper. The flange 16' serves as a protecting shield or cover for the ends of the windings. Suitable connections 17 are established between the windings and collector rings 18 mounted on the shaft.

In the construction shown in Fig. 3 the coil supports 9', similarly placed to the coil supports 9 of the construction shown in Figs. 1 and 2, are not split into two parts along a radial plane but the whole coil support is divided into a number of short blocks 12' which may be inserted in the same manner as are the blocks 12 of the construction shown in Figs. 1 and 2. As shown in Fig. 3 only one end of the windings need extend beyond the core, a distance greater than the width of the blocks 12'. A similar arrangement may be made with respect to construction shown in Figs. 1 and 2. In some cases channels 19 may be formed between the two halves of the supports 9 into which expanding wedges 20 may be forced to spread the coil holder parts firmly against the adjacent windings and the walls of the slots into which the inner ends of the coil supports are dovetailed.

Instead of having the spaces formed between adjacent coil supports and the core body of the exact shape of the winding as in the construction shown in Figs. 1 and 2, the passages may be made larger and of different shape than the windings as shown in Fig. 4, in which case wedges 21 are driven into the spaces left to lock the whole firmly together.

It will be obvious to all those skilled in the art that changes may be made in the form of my invention without departing from its spirit, and I do not wish the claims hereinafter made to be limited to the particular construction shown more than is made necessary by the state of the art.

What I claim as new and desire to secure by Letters Patent of the United States, is,—

1. In combination, a core comprising a body portion and integral projections extending therefrom, and conductor holders secured to said body portion and combining with the integral projections to form a substantially cylindrical member, some of said coil holders being formed of magnetic material, and others of non-magnetic material, said cylinder member having conductor-receiving recesses formed therein.

2. In combination, a core comprising a body portion, polar projections extending therefrom, and conductor holders secured to said body portion and combining with the body and polar projections to form a substantially cylindrical member, some of said coil holders being formed of magnetic material and others of non-magnetic material, said polar projections and said conductor holders having conductor-receiving recesses.

3. In combination, a cylindrical core having axially-extending undercut grooves formed in its surface, a formed coil for said core, proportioned so that a space extends between one end of the core and the inner surface of one end of said coil and coil holders, one entering each of said grooves, each of said coil holders being divided longitudinally in two parts, one of said parts extending throughout the length of the coil holders and being inserted radially in the corresponding groove and the other of said parts being sub-divided into short blocks which are passed one at a time radially into said space between the end of the coil and the end of the core, and then moved axially into the undercut groove.

4. In combination, a core, a distributed winding, a plurality of winding holders arranged between the parts of the distributed winding, some of said holders being formed of magnetic material, and others of non-magnetic material.

5. In combination, a rotating field magnet, comprising a cylindrical body portion with polar projections, said body portion being formed with axially-extending undercut grooves or slots located about its periphery, a winding surrounding each polar projection, and a plurality of coil holders formed with tenons each dovetailed into said slots, some of said holders being formed of magnetic material and others of said holders being formed of non-magnetic material.

6. In combination, a field magnet, comprising a body portion, polar projections extending therefrom, and coil holders dovetailed into said body portion and shaped so that the external surfaces of the polar projections and the coil holders unite to form a substantially cylindrical body, some of said coil holders being formed of magnetic material and others of non-magnetic material.

7. In a rotating field magnet, a body portion, polar projections extending therefrom, coil holders secured to said body portion and combining with the polar projections to form a substantially cylindrical body, some of said coil holders being formed of magnetic material and others of non-magnetic material.

In witness whereof, I have hereunto set my hand this 23d day of March, 1905.

KARL SULZBERGER

Witnesses:
  MAX HAMBURGER,
  JULIUS RUMLAND.